Jan. 29, 1957 G. M. EUBANKS 2,779,203
VARIABLE SPEED CONTROL
Filed Dec. 6, 1954 2 Sheets-Sheet 1
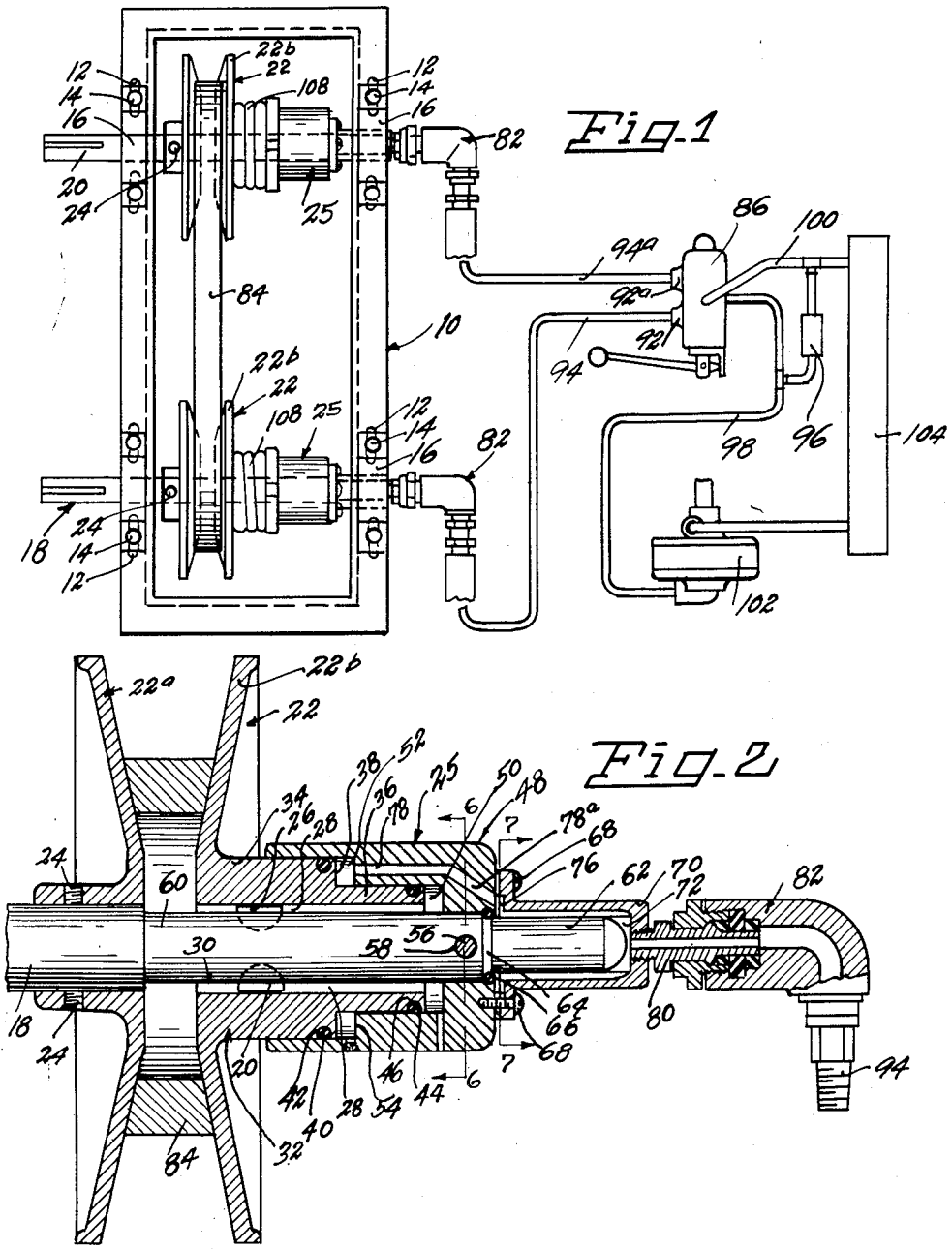
INVENTOR.
Glenn M. Eubanks
BY
Fish and Huff Jan. 29, 1957  G. M. EUBANKS  2,779,203
VARIABLE SPEED CONTROL
Filed Dec. 6, 1954  2 Sheets-Sheet 2

INVENTOR.
Glenn M. Eubanks
BY
Fish and Huff

United States Patent Office 2,779,203
Patented Jan. 29, 1957

2,779,203

VARIABLE SPEED CONTROL

Glenn M. Eubanks, Walla Walla, Wash., assignor to Morrison Supply Company, Walla Walla, Wash.

Application December 6, 1954, Serial No. 473,198

6 Claims. (Cl. 74—230.17)

This invention relates to improvements in variable ratio power transmissions, and more particularly to a fluid motor operated variable pitch pulley for a power transmission and the method of operating the transmission.

An object of the invention lies in the method of supplying fluid under pressure to both motors of a variable ratio power transmission which includes a pair of fluid motor operated variable pitch pulleys interconnected by means of a V-belt, and alternately relieving the pressure to a selected one of the motors to vary the ratio of the companion pulleys.

Another object of the invention lies in the provision of a pulley of the variable pitch type having an improved fluid operated motor.

Another object of the invention lies in the provision of a pulley of the variable pitch type having a fluid motor, the cylinder of which is carried by the shaft on which the pulley is mounted and rotates therewith, and has novel journal means through which the pressurized fluid is admitted to the cylinder.

Another object of the invention lies in the provision of a variable ratio power transmission which is admirably suited for a number of uses such as in the drive line of a harvester reel, the improved construction of which provides means for producing changes in speed easily and quickly with a minimum of physical effort on the part of the operator of the machine on which the transmission is employed.

A further object is to provide a variable pitch pulley for use in a variable speed transmission wherein the hydraulic cylinder and piston are mounted on the shaft on which the pulley is mounted, thus eliminating thrust on the bearings of the shaft.

A still further object of the invention lies in the provision of a variable speed transmission employing variable pitch pulleys having fluid motors wherein fluid under pressure is equally applied to the fluid motors during operation of the transmission and when it is desired to vary the ratio of the transmission, the fluid pressure of one said motor is relieved.

Yet another object is to provide means of improved construction for selectively varying the speed ratio between an input and output shaft.

These and other objects and advantages of the invention will be apparent during the course of the following description, in which one embodiment of the invention and the novel features thereof will be particularly pointed out. It should be understood, however, that the drawing and specification are for the purpose of illustration only, and are not intended to limit the invention beyond the scope of the appended claims.

In the accompanying drawings forming a part of this specification and in which like numerals are employed to designate like parts:

Figure 1 is a plan view of my improved variable ratio power transmission associated with a fluid pressure control system in diagram;

Figure 2 is a vertical cross section taken longitudinally through one of the improved pulleys and associated parts;

Figure 3:
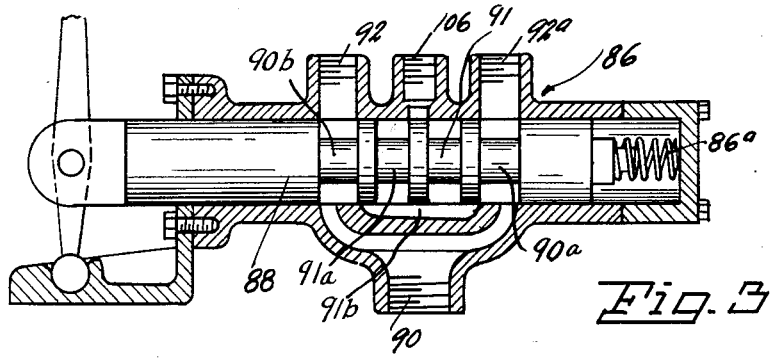
Figure 3 is a longitudinal vertical cross section through the control valve in the normal or neutral position.

In Figure 1, the numeral 10 represents the supporting frame which is here shown to be rectangular in shape and is constructed by shaping and welding a length of angle or channel iron. The frame is provided with a plurality of slots 12 disposed to receive the anchoring bolts 14 of bearings 16, which are preferably of the self-aligning type, and the slots extend longitudinally of the supporting frame 10 to provide means for adjusting the driving shaft 18 and the driven shaft 20 toward and away from each other, and also to adjust their parallel linearity.

Each of the shafts 18 and 20 has provided thereon a fluid motor operated variable pitch pulley 22 having belt engaging members 22a and 22b and fluid motors 25 operably associated with the members 22b. The belt engaging members 22a are each rigidly secured to the shaft on which the respectively pulley is mounted by means of set screws 24 which may pass through the diameter of the shaft 18 or 20, but to preclude weakening of the shaft I prefer that they impinge against the peripheral face thereof or seat in sockets formed therein. Therefore, the set screws 24 hold the fixed members 22a against rotation about their respective shafts and also against endwise or axial movement thereof.

The belt engaging members 22b are mounted on their respective shafts for movement axially thereof toward and from their companion members 22a, and are secured for rotation with the shafts, for example, by means of keys 26 which cooperate with keyways 28 formed axially parallel in the internal bore 30 of an integral cylindrical extension 32 extending axially from the movable belt engaging member 22b rightward from its face opposite to the belt engaging member 22a. This extension 32 constitutes a piston having an enlarged base portion 34 and a reduced outer end portion 36 defined by means of an annular shoulder 38 intermediate the two portions. An O-ring 40 is disposed in an annular sealing ring seat 42 formed in the base portion 34 adjacent to the shoulder 38, while a smaller O-ring 44 is disposed in an annular seat 46 formed in the peripheral face of the reduced end portion at its free end.

Reciprocally receiving the piston 32, I provide a cylinder 48 which has an internal configuration companion to the piston 32. At its inner end, the cylinder 48 is provided with a reduced bore 50 into which the reduced end portion 36 is telescopically disposed, and an enlarged outer bore 52 telescopically receiving the base portion 34. The two bore diameters 50 and 52 are defined by an intermediate shoulder 54. One cylinder 48 is secured to each shaft 18 and 20, for example, by means of a diametrically extending anchor pin 56 which extends through the thickened outer end portion of the cylinder 48 and a diametrically disposed aligned bore 58 in the respective shaft 18 or 20.

To maintain the several parts at a minimum size and yet effective for their purpose, the shafts 18 and 20 are reduced at 60, which is the portion extending rightward from the belt engaging element 22a as seen in Figure 2, and commensurate with the outer end wall of the cylinder 48, the shaft is further reduced at 62 to provide a stud. Intermediate the reduced portion 60 and 62 is an angled shoulder 64, to receive an O-ring 66 applied over the stud 62 and seated against the angled shoulder 64, thus providing fluid sealing means at the end of the cylinder 48 to prevent fluid entrance into the cylinder around the shafts 18 or 20.

To the outer end of cylinder 48 I secure, for example, by screws 68, a fluid tight cap 70 which has an axial bore 72 adapted to fit about the stud 62 and support the stud therein. Longitudinally extending fluid conduits 74 are formed in the inner bore of the cap 70 and communicate with an annular ring conduit 76 at the leftward end of the cap 70.

A substantially axially parallel bore 78 is formed through the cylinder 48 and extends from its shoulder 54 to the outer end where it communicates with the ring conduit 76. As shown in the drawing, the bore 78 has an angled portion 78a, but it will be understood that the bore may extend parallel or at an angle as desired, as long as one end communicates with the shoulder 54 and the other with the ring conduit 76.

Coaxial with the respective shaft 18 or 20, the cap 70 is drilled and tapped to receive a fitting 80 of a conventional fluid swivel connection 82. It will thus be seen that fluid supplied under pressure through the swivel connection 82 will pass through the cap 70 by means of conduit 74 into the ring conduit 76, and thence through the bore 78 which exhausts at the shoulder 54 of cylinder 48. It is therefore seen that the fluid is supplied for actuation of the piston 32 by pressure against the piston head or shoulder 38, and is confined against leakage by the O-rings 40 and 44.

It is also to be noted that the caps 70 constitute journals of the shafts 18 and 22 and are rotatably carried in bearings 16. This forms a practical means of admitting fluid under pressure to the cylinder and yet avoids the necessity for drilling the shafts 18 or 20.

An endless V-belt 84 is trained about the companion pulleys 22 and its natural tension, selected by adjustment of shafts 18 and 20 toward and from each other, causes it to urge movement of the belt engaging members 22b away from the members 22a.

Inspection of Figure 3 will disclose that the valve 86 is of the plural discharge constant pressure distributing type, and when the plunger 88 having reduced areas 90a and 90b forming passages is disposed in its normal position as seen in Figure 3, fluid under pressure admitted through the inlet 90 is directed to the discharges 92 and and 92a therethrough under equal pressure and is thence directed through tubular conduit 94 and 94a to their respective fluid motor 25. A pressure relief valve 96 is connected across the pressure line 98, and the return line 100, so that when the pressure in lines 98, 94, and 94a reach a predetermined amount, the pressurized fluid pumped by the motor driven pump 102 opens the pressure relief valve 96, returning the excess fluid above that required to maintain pressure on the motors 25 to the reservoir 104 through the return line 100. This relief valve 96 may be incorporated in the valve 86 if desired or, as shown, may be an entirely separate valve.

Figure 4:
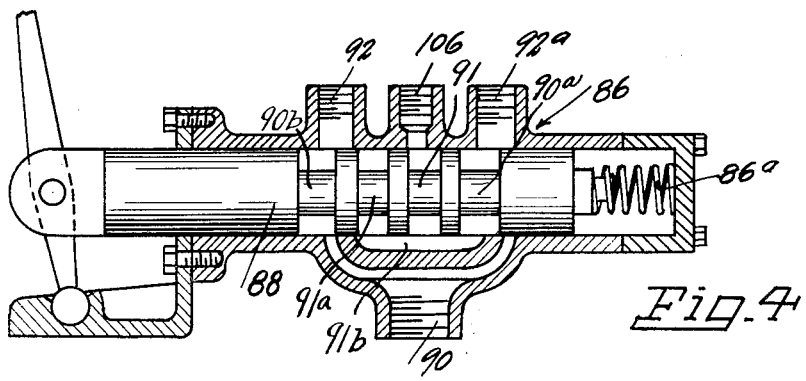
Figure 4 is a view similar to that of Figure 3 with the valve disposed to relieve pressure to one fluid motor.
Figure 5:
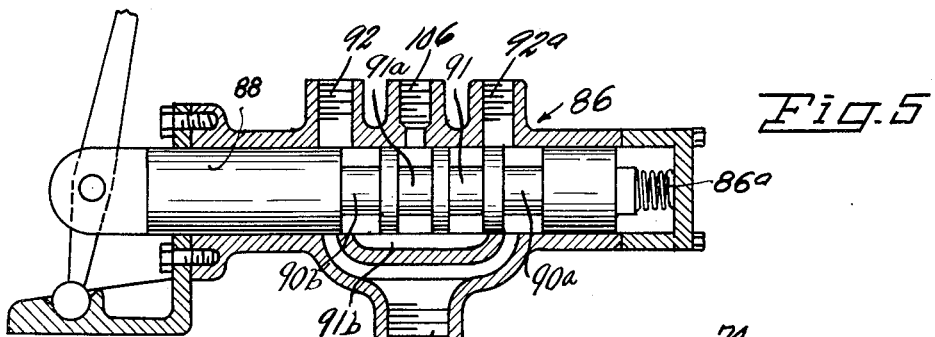
Figure 5 is a view similar to Figures 3 and 4 with the valve positioned to relieve fluid pressure to the opposed fluid motor.
Figure 6:
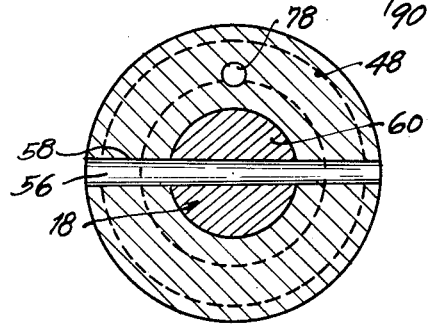
Figure 6 is a vertical transverse cross section taken on the plate indicated by line 6—6 of Figure 2 and looking in the direction of the arrows.
Figure 7:
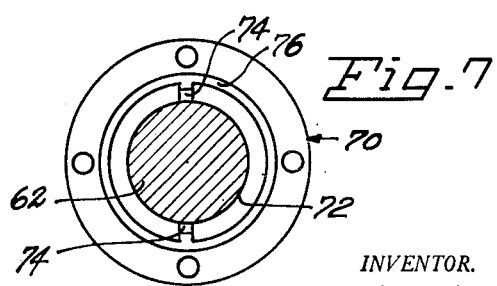
Figure 7 is a vertical transverse cross section taken on the plane indicated by line 7—7 of Figure 2 and looking in the direction of the arrows.

When the plunger 88 of the valve 86 is manually moved to the position shown in Figure 4, fluid under pressure entering through the inlet 90 is directed to the outlet 92, through passage 90b while the pressure to the outlet 92a is relieved by the outlet 92a being connected through reduced portion 90a of the plunger 88, passage 91b and reduced portion 91 to the discharge 106, which communicates with the return line 100. In Figure 5, opposite positioning of the plunger 88 communicates the discharge 92a with the inlet 90 through passage 90a and the outlet 92 with the return line 100 through reduced portion 90b of plunger 88 passage 91b and reduced portion 91a.

It will thus be seen that as the element 22b of one pulley 22 is moved toward its companion element 22a by means of fluid pressure, the V-belt 84 is caused to traverse a greater diameter circle about the pulley, thus pulling the V-belt into the opposed pulley and forcing the movable element 22b outwardly thereof and the relief of the fluid pressure to the second named pulley will permit outward movement of the movable element 22b thereof, thus effecting change of ratio.

When the valve 86 is released to return by means of the spring 86a to normal, the constant pressure determined by the relief valve 96 is applied to both fluid motors 25, and the ratio remains fixed.

Flexible dust covers 108 are shown in Figure 1 to cover the base portions 34 of the pistons 32 to prevent dust or other material from interfering with proper operation of the pulleys.

Having thus described my invention, I desire to protect by Letters Patent of the United States and claim as new the following:

1. A pulley for a variable speed transmission and for cooperation with a V-belt comprising a shaft; a pair of belt engaging members mounted on said shaft and one of which is movable axially of said shaft toward and from the other belt engaging member; said movable belt engaging member having a piston on the face opposed to the other belt engaging member; a cylinder on said shaft and fixed against axial movement away from said belt engaging members and into which said piston reciprocally extends; said cylinder having an axially parallel bore extending from the end opposed to said belt engaging members and communicating with the interior thereof; a cap having an axial bore receiving in close tolerance an end portion of said shaft and constituting a journal thereof and sealingly fixed on the end of said cylinder; a fluid conduit in said cap communicating with said cylinder bore; and means for supplying fluid under pressure into said cap conduit for transmission to said cylinder.

2. A pulley for a variable speed transmission and for cooperation with a V-belt comprising a shaft; a pair of belt engaging members mounted on said shaft and one of which is movable axially of the shaft toward and from the other belt engaging member; said movable belt engaging member having a piston on the face opposed to the other belt engaging member; a cylinder on said shaft fixed against axial movement away from said belt engaging members and into which said piston reciprocally extends; said cylinder having an axially parallel bore extending from the end opposed to said belt engaging members and communicating with the interior thereof; a fluid tight cap having an axial bore receiving and supporting an end portion of said shaft and constituting a journal thereof and sealingly fixed on the end of said cylinder; axially parallel fluid transmission conduits formed in said cap and communicating with the bore of said cylinder; and means for supplying fluid under pressure into said cap for transmission to said cylinder.

3. A pulley for a variable speed transmission and for cooperation with a V-belt comprising a shaft; a pair of belt engaging members mounted on said shaft and one of which is movable axially on said shaft toward and from the other belt engaging member; said movable belt engaging member having on its face opposite to the other belt engaging member an integral cylindrical extension constituting a piston, said piston having a base portion and a reduced outer end portion with an annular shoulder therebetween; a cylinder having an internal configuration companion to said piston and including an annular shoulder intermediate its length and reciprocally receiving said piston; and means supplying fluid under pressure into said cylinder intermediate the annular shoulders of said piston and cylinder.

4. The invention as defined in claim 3 wherein said piston is provided with means for sealing intermediate said piston and said cylinder at the free end of said reduced end portion and on the base portion adjacent to the annular shoulder of said piston.

5. A pulley for a variable speed transmission and for cooperation with a V-belt comprising a shaft; a pair of belt engaging members mounted on said shaft and one of which is movable axially of said shaft toward and from the other belt engaging member; said movable belt engaging member having on its face opposite to the other belt engaging member an integral cylindrical extension constituting a piston; said piston having a base portion and a reduced outer end portion with an annular shoulder therebetween; a cylinder having an internal configuration companion to said piston and including an annular shoulder intermediate its length and reciprocally receiving said piston; said cylinder having an axially parallel bore extending from the end opposed to said belt engaging members and communicating with the interior thereof at the annular shoulder of said cylinder; a fluid tight cap having an axial bore receiving and supporting an end portion of said shaft and constituting a journal thereof; and sealingly fixed to said cylinder; a fluid conduit in said cap communicating with said cylinder bore and means for supplying fluid under pressure into said cap for transmission to said cylinder.

6. A pulley for a variable speed transmission and for cooperation with a V-belt comprising a shaft; a pair of belt engaging members mounted on said shaft and one of which is movable axially of said shaft toward and from the other belt engaging member; said movable belt engaging member having on its face opposite to the other belt engaging member an integral cylindrical extension constituting a piston; said piston having a base portion and a reduced outer end portion with an annular shoulder therebetween, a cylinder having an internal configuration companion to said piston and including an annular shoulder intermediate its length and reciprocally receiving said piston; a fluid tight cap having an axial bore receiving and supporting an end portion of said shaft and constituting a journal thereof and sealingly fixed on the end of said cylinder; axially parallel fluid transmission conduits formed in said cap and communicating with the bore of said cylinder; and means for supplying fluid under pressure into said cap for transmission to said cylinder.

References Cited in the file of this patent
UNITED STATES PATENTS

| | | |
|---|---|---|
| 692,120 | Conner | Jan. 28, 1902 |
| 1,035,860 | Conradson | Aug. 20, 1912 |
| 2,198,940 | Heyer | Apr. 30, 1940 |
| 2,256,114 | Heyer | Sept. 16, 1941 |
| 2,660,069 | Horne | Nov. 24, 1953 |